(12) United States Patent
White et al.

(10) Patent No.: US 8,931,738 B2
(45) Date of Patent: Jan. 13, 2015

(54) RELEASABLE RADOME COVER

(75) Inventors: Phillip Craige White, Tucson, AZ (US); Robert L. Sisk, III, Sahuarita, AZ (US); Brian S. Scott, Vail, AZ (US); Larry A. Coleman, Tucson, AZ (US); Gary H. Johnson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 429 days.

(21) Appl. No.: 13/401,768

(22) Filed: Feb. 21, 2012

(65) Prior Publication Data

US 2013/0214093 A1 Aug. 22, 2013

(51) Int. Cl.
*B64C 1/10* (2006.01)

(52) U.S. Cl.
USPC ........................................ 244/121; 244/129.4

(58) Field of Classification Search
USPC .......................................................... 244/121
See application file for complete search history.

(56) References Cited

U.S. PATENT DOCUMENTS

| | | | | |
|---|---|---|---|---|
| 4,867,357 A | * | 9/1989 | Inglis et al. | 244/121 |
| 5,125,600 A | * | 6/1992 | Brumbaugh | 244/121 |
| 5,167,386 A | * | 12/1992 | Laquer et al. | 244/121 |
| 5,743,492 A | * | 4/1998 | Chan et al. | 244/118.2 |
| 5,820,077 A | * | 10/1998 | Sutliff et al. | 244/119 |
| 6,679,453 B2 | * | 1/2004 | Steiner | 244/121 |
| 7,082,878 B2 | * | 8/2006 | Facciano et al. | 102/377 |
| 7,093,799 B1 | * | 8/2006 | Dulat et al. | 244/121 |
| 7,909,289 B2 | * | 3/2011 | Perez-Sanchez | 244/129.4 |
| 8,061,656 B1 | * | 11/2011 | Renn et al. | 244/122 AF |
| 8,333,151 B2 | * | 12/2012 | Krisher | 102/378 |
| 8,497,456 B2 | * | 7/2013 | Eisentraut | 244/3.1 |
| 8,519,312 B1 | * | 8/2013 | Merems | 244/3.1 |
| 2006/0145940 A1 | * | 7/2006 | Kuroda et al. | 343/911 R |
| 2007/0164159 A1 | * | 7/2007 | Koch et al. | 244/121 |
| 2009/0173824 A1 | * | 7/2009 | Perez-Sanchez | 244/129.4 |
| 2010/0310242 A1 | * | 12/2010 | Zubalsky et al. | 396/12 |
| 2011/0101164 A1 | * | 5/2011 | Koch et al. | 244/121 |
| 2012/0138728 A1 | * | 6/2012 | Brunton et al. | 244/3.16 |
| 2013/0021214 A1 | * | 1/2013 | Zimmerman et al. | 343/761 |
| 2013/0087657 A9 | * | 4/2013 | Koch et al. | 244/121 |

* cited by examiner

*Primary Examiner* — Christopher P Ellis
*Assistant Examiner* — Medhat Badawi
(74) *Attorney, Agent, or Firm* — Renner, Otto, Boisselle & Sklar, LLP (57) ABSTRACT

A protective cover (10) for an instrument dome (12) extending from a body (20) of a vehicle, such as a missile. The cover (10) includes multiple segments (14 and 16) having trailing ends (18) connectable to the body (20) at joints (22) that allow for rotational movement. The cover (10) further includes a releasable holder (26) that includes a retention device (28) that holds leading ends (24) of the segments (14 and 16) together, and a release mechanism (30) for causing the retention device (28) to release the leading ends (24). The joints (22) hold the trailing ends (18) of the segments (14 and 16) to the body (20) through a predetermined range of motion beyond which the segments (14 and 16) will be released to separate from the body (20) when the segments (14 and 16) rotate beyond the predetermined range.

12 Claims, 6 Drawing Sheets

RELEASABLE RADOME COVER

This invention was made with United States government support under Contract No. FA8672-10-C-0002 awarded by the U.S. Air Force. The U.S. government has certain rights in the invention.

FIELD OF THE INVENTION

The present invention relates to a detachable cover for protecting electronic components in a high speed vehicle, such as a missile.

BACKGROUND

High speed vehicles, such as aircraft and missiles, often use an array of electronic instruments for guidance, tracking, and targeting functions. A transparent dome, which is transparent to the electromagnetic waves used by the instruments, typically protects such instruments from the elements during flight. The dome needs to be protected, however, to avoid scratching, pitting, or otherwise damaging the dome during transport or storage or until the instruments are needed.

Covers for such domes are known, but to date such covers have not been without their problems. The cover must be removed or retracted when no longer needed for its protective abilities. The dome cover generally is discarded when no longer needed. Typically, the cover separates into multiple segments. If these segments are discarded by releasing them to fall away from the dome, the segments can impact and potentially damage antennas or control surfaces, such as missile tail fins, protruding from the surface of the vehicle. The cover also can stress or otherwise damage the dome or other vehicle structures as it is discarded.

SUMMARY OF THE INVENTION

The present invention provides a cover for a transparent dome that protects the instruments in a missile or other applications for high speed vehicles, and when it is no longer needed the cover can be discarded without damaging related structures of the vehicle. The dome cover provided by the present invention has multiple segments that are hingedly couplable to a body and are held together with a locking mechanism to define a protected volume that has an approximately dome-shaped surface. Conical and hemispherical shapes approximate a dome shape, for example. The hinged connection is designed to provide a pivot for the cover segments to rotate outwardly.

More specifically, the present invention provides a protective cover for an instrument dome extending from a body of a vehicle, such as a missile. The cover includes multiple segments having trailing ends connectable to a body at joints that allow for rotational movement. The cover further includes a releasable holder that includes a retention device that holds leading ends of the segments together and a release mechanism for causing the retention device to release the leading ends. The joints hold the trailing ends of the segments to the body through a predetermined range of motion beyond which the segments will be released to separate from the body when the segments rotate beyond the predetermined range.

In one or more exemplary embodiments of the cover, the joints include slots formed adjacent the body and corresponding tab portions extending from the segments and captured in corresponding slots while allowing for relative rotation through the predetermined range of motion. The segments are movable between a first position in which the tab portions engage respective slots to limit movement of the segments in an outward direction and to limit movement of the segments in a rearward direction, and a second position rotatably displaced from the first position and in which the tab portions are free of contact with the slots that would limit movement of the tab portions in an outward direction, thereby permitting separation of the segments from the body.

An exemplary retention device includes a shear pin that couples the leading ends of two or more segments together. And an exemplary release mechanism includes an actuator to force leading ends of the segments apart to break the shear pin and release the segments.

The segments are in a closed position when the leading ends of the segments are held together, and in the closed position the segments are preloaded such that when the leading ends of the segments are released they are propelled apart. Accordingly, the cover may further include a spring element outwardly biasing at least one segment. The spring element may be integrally formed in at least one of the segments. In one or more embodiments, at least one of the segments is formed of a resilient material and has a protrusion extending from an inner surface to form cantilever spring portions in the segment on either side of the protrusion.

The present invention also includes a missile having a body, an instrument dome extending from the body, and a protective cover, as described above.

Additionally, the present invention also can be described as providing a protective cover for an instrument dome extending from a body of a vehicle, that includes multiple segments having trailing ends connectable to a body at joints that allow for rotational movement. The cover further includes a releasable holder that includes means for holding leading ends of the segments together; and means for causing the holding means to release the leading ends. The joints hold the trailing ends of the segments to the body through a predetermined range of motion beyond which the segments will be released to separate from the body when the segments rotate beyond the predetermined range.

The holding means may include a shear pin extending through an opening in one segment and into a threaded hole secured to another segment. The means for causing the holding means to release the leading ends may include an actuator secured to one segment that acts against a push block secured to another segment to force the segments apart.

According to another aspect, the present invention provides a protective cover for an instrument dome extending from a body of a vehicle that includes multiple segments and a joint connecting the segments to the body. The joint is defined by first and second components, the first component being connected to the body adjacent a trailing end of the segments, and the second component being connected to the trailing end of corresponding segments. The first component defines a slot, and the second component has a tab portion proportioned to engage the slot. The segments are movable between a first position in which the tab portion engages the slot to limit movement of the segment in an outward direction and to limit movement of the segment in a rearward direction, and a second position rotatably displaced from the first position and in which the tab portion is free of contact with the slot that would limit movement of the tab portion in an outward direction, thereby permitting separation of the segment from the body.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

Referring now to the drawings, and initially FIGS. 1-4, the present invention provides a dome cover 10 for electronic instruments (not shown) behind a transparent instrument dome 12 that protects the instruments and yet is transparent to the electromagnetic waves used by the instruments. The cover 10 protects the dome 12 from damage during transport or storage or otherwise until the instruments are needed.

The dome cover 10 has multiple segments, and in the illustrated embodiment the cover 10 has two segments, first and second segments 14 and 16. The segments 14 and 16 have trailing ends 18 connected to a body 20 of a vehicle, such as the body of a missile, at joints 22 that allow for rotational movement. At end of a missile, the body 20 has a generally cylindrical shape and the instrument dome extends from a leading end of the body 20. When leading ends 24 of the segment 14 and 16 (opposite the trailing ends 18) come together, the segments 14 and 16 combine to define an interior volume suitable for receipt of the dome 12 therein.

In the illustrated embodiment, the dome cover 10 includes two equal segments 14 and 16 that come together to define an approximately hemispherical volume that encloses the dome 12. Such a dome cover 10 with two equal segments may be referred to as a clamshell design. Although the illustrated segments 14 and 16 have a generally arcuate panel-like shape, other shapes are within the scope of the invention. The exterior of the dome cover 10 typically defines an aerodynamic shape when in the closed condition with the leading ends 24 together. The volume protected by the cover 10 can have the shape of a hemisphere, a cone, a rounded cone, a cylinder, or other shape. The cover 10 can be used to protect any shape and does not have to form the same shape on its interior surface as the shape defined by the exterior surface of the instrument dome 12.

The segments 14 and 16 of the dome 10 are held together with a releasable holder 26 that includes both a retention device that holds leading ends of the segments together and a release mechanism for causing the retention device to release the leading ends. An exemplary retention device includes one or more, and in the illustrated embodiment two, shear pins 28. The release mechanism includes an actuator 30 to force the cover segments 14 and 16 apart to break the shear pins 28. The shear pins 28 may be in the form of screws or bolts, for example. Thus the releasable holder 26 includes both the shear pins 28 and the actuator 30. The shear pins 28 are inserted through openings in recesses 32 in the first segment 14 and threadably received in threaded holes 34 in the second segment 16. These holes 34 are formed in connecting blocks 36 integrally formed in or mounted inside the second segment 16. The actuator 30 is mounted inside the first segment 14 of the dome cover 10 for acting against the second segment 16, specifically against a push block 38 integrally formed in or mounted inside the second segment 16 of the cover 10. The actuator 30 presses against the push block 38 and breaks the shear pins 28 by forcing the segments 14 and 16 apart, thereby releasing the cover segments 14 and 16 from the retention device. Although one exemplary holder 26 is shown and described, other mechanisms and devices that hold the segments of the dome cover in place until needed are within the scope of the present invention. Other potential devices for holding the segments in a closed position until needed include: magnetic holders, latches, carbon fibers or other connecting elements with a device for cutting or otherwise breaking the connection.

Other features of the dome cover 10 also can help to maintain a seal between the segments 14 and 16, such as interlocking tabs, ridges, or gaskets 40 where the segments 14 and 16 meet one another. A gasket 42 also can be provided circumferentially adjacent the base of the dome cover 10, for engaging the dome 12 or the body 20 of the vehicle to prevent or minimize the entry of water or dust that could damage the dome 12 or the instruments therein.

Additionally, the body 20 optionally can have a protrusion that acts as a guide 60 for alignment with a slotted alignment window 62 in the segment 14 or 16 to facilitate aligning the segment 14 or 16 during assembly, as described further below.

As mentioned above, the segments 14 and 16 are connected to the body 20 by joints 22. The joints 22 hold the trailing ends 18 of the segments 14 and 16 to the body 20 through a predetermined range of motion beyond which the segments 14 and 16 will be released to separate from the body 20 when the segments 14 and 16 rotate beyond the predetermined range. An exemplary range of rotation is about five degrees to about ninety degrees, and preferably about fifteen degrees to about forty-five degrees. At the end of the range of rotation, the segment 14 or 16 is released from its connection to the body 20. The angle at which the segment 14 or 16 is released is referred to as the release angle.

The joints 22 are designed to help hold the cover 10 on the body 20 and to provide a pivot for the first and second cover segments 14 and 16 to rotate outwardly away from the body 20 when released from the retention device (in this embodiment, when the shear pins 28 are broken). The cover 10 generally is removed while the body 20 is in flight. Thus when the cover segments 14 and 16 are released from the retention device and the cover segments 14 and 16 rotate through an initial angle, the separated segments 14 and 16 form scoops that catch the air on their inside surfaces, whereby aerodynamic forces applied to those segments 14 and 16 typically accelerate their separation and rotation about the pivot provided by the joint 22.

The illustrated joint 22 also prevents the cover segments 14 and 16 from releasing while the shear pins 28 or other retention device is holding the cover segments 14 and 16 together. The illustrated joint 22 allows the cover segments 14 and 16 to pivot through a predetermined angle, such as about 45 degrees, and then releases the cover segments 14 and 16 so that they will fall outwardly, away from the body 20, thereby reducing or eliminating the risk of damage to other parts of the body 20, including antennas or control surfaces, such as tail fins.

Figure 1:
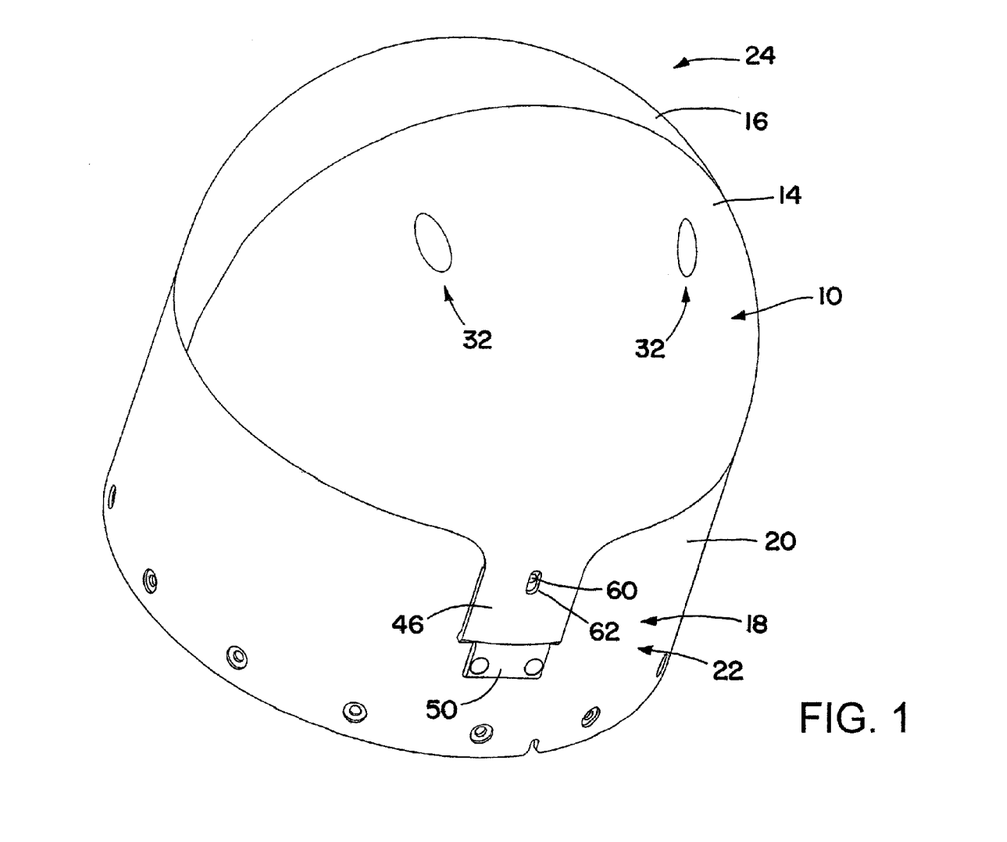
FIG. 1 is a perspective view of a dome cover provided in accordance with the present invention in a closed condition.
Figure 2:
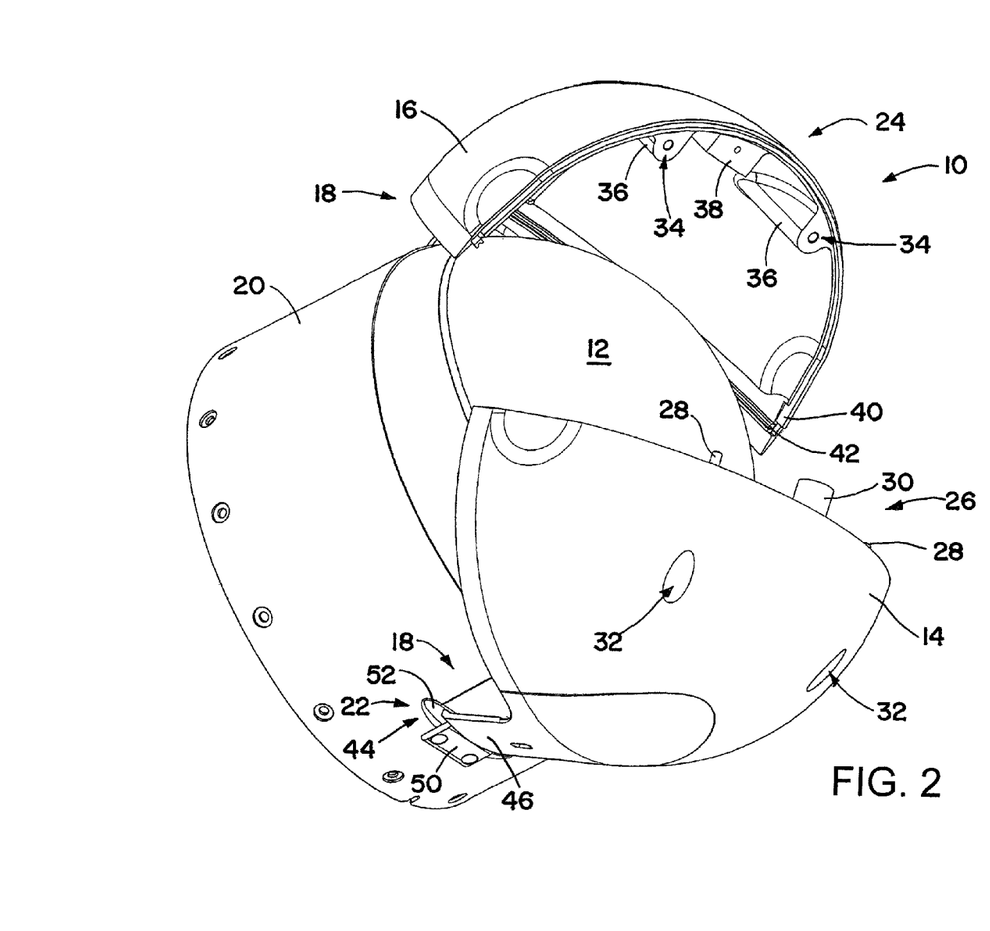
FIG. 2 is a perspective view of the dome cover provided in accordance with the present invention in an open condition.
Figure 3:
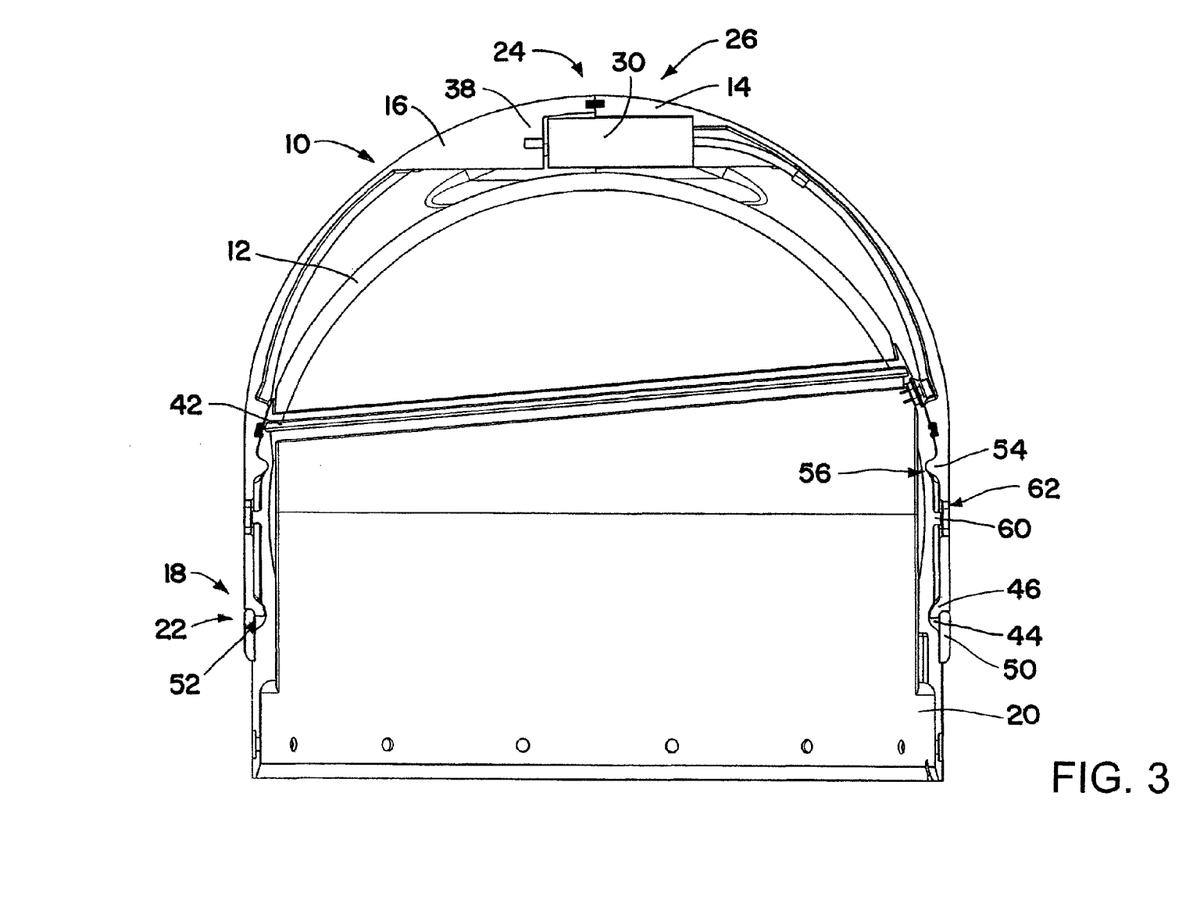
FIG. 3 is a cross-segmental view of the dome cover provided by the present invention in a closed condition.
Figure 4:
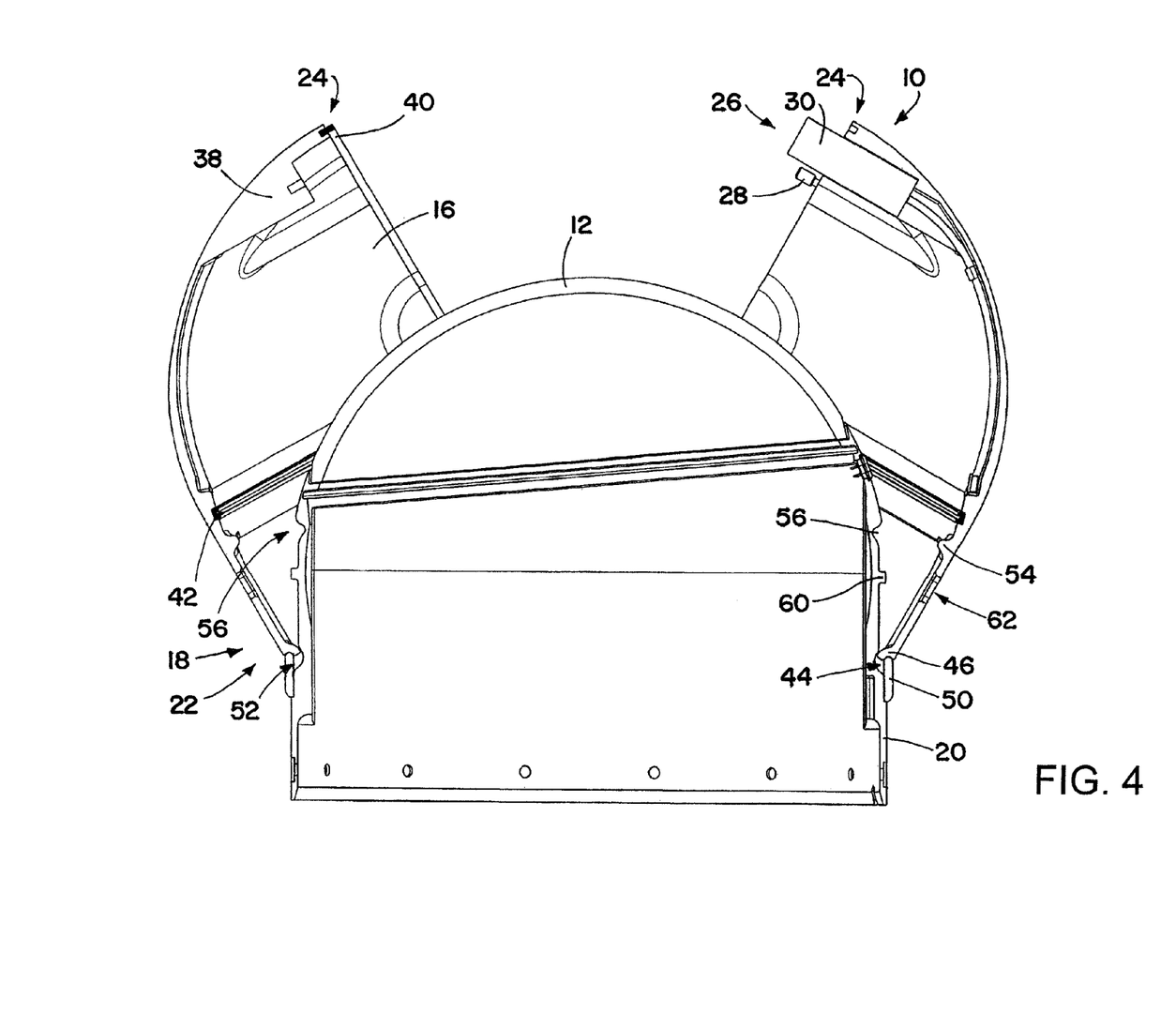
FIG. 4 is a cross-segmental view of the dome cover provided by the present invention in an open condition.
Figure 5:
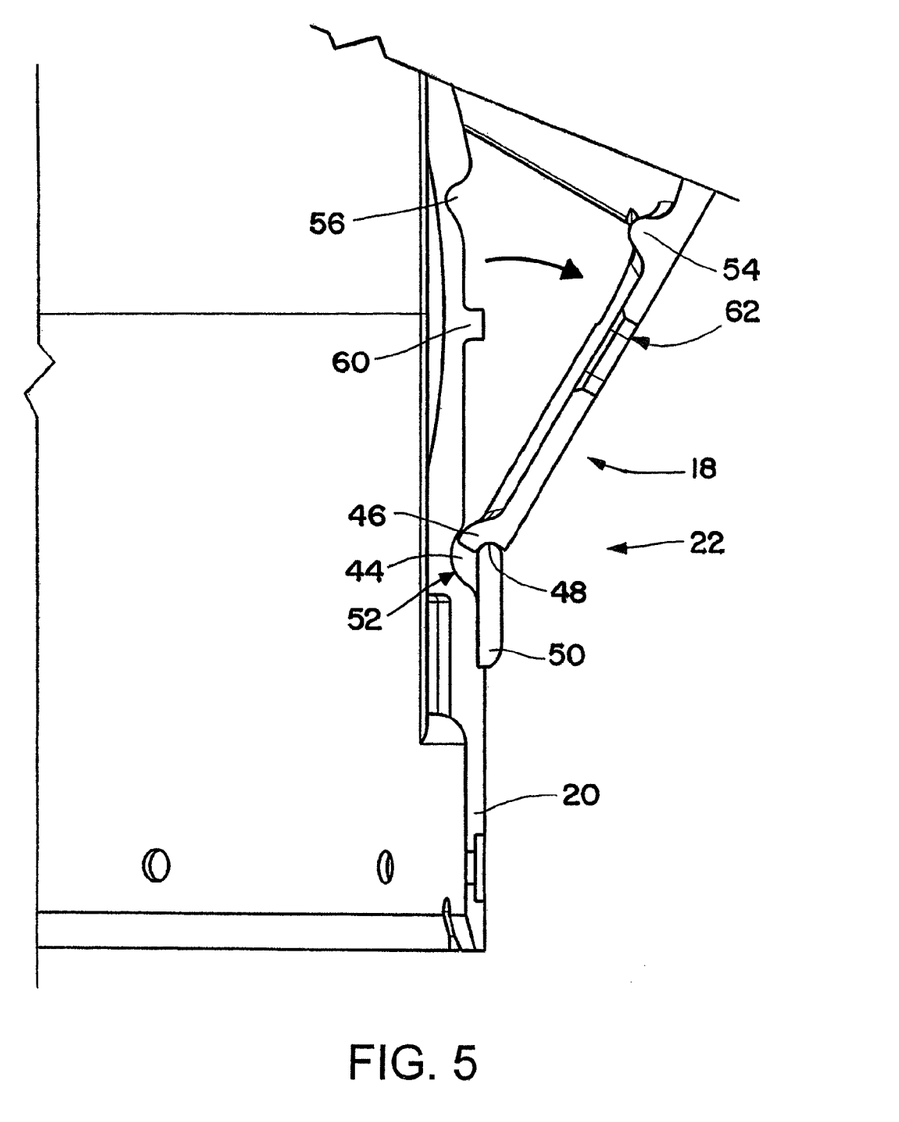
FIG. 5 is an enlarged view of a hinge portion of the dome cover shown in FIG. 4.
Figure 6:
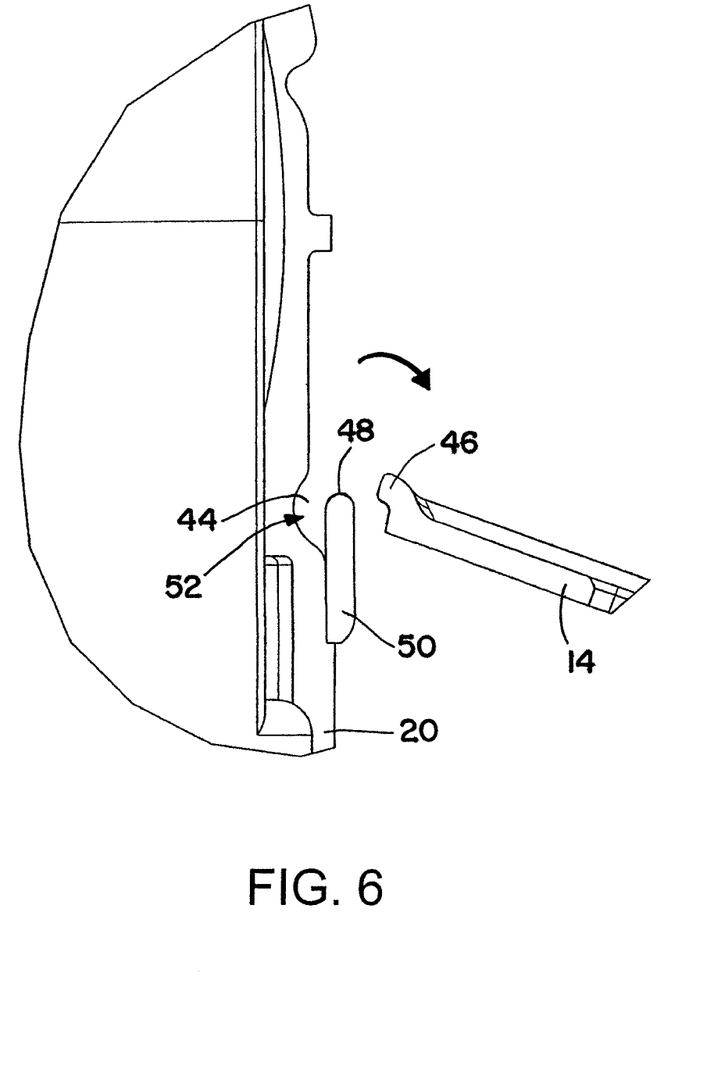
FIG. 6 is an enlarged schematic view of a hinge portion of the dome cover provided by the invention showing separation of the hinge portion.

Further details of the illustrated exemplary joint 22 will be described with respect to FIGS. 5 and 6. The illustrated joint 22 provides a tab-and-slot-type interface between the cover segment 14 or 16 and the body 20. The tab-and-slot joint can be referred to as a tongue-and-groove and includes similar devices with corresponding shapes, particularly compatible arcuate shapes. The joint 22 includes a slot 44 formed adjacent the body 20 and a corresponding tab portion 46 extending from the trailing end 18 of the segment 14 or 16. From the closed condition of the segment 14 or 16 the tab portion 46 is captured in the corresponding slot 44 while allowing for relative rotation through the predetermined range of motion. The illustrated tab portion 46 and the slot 44 have corresponding arcuate shapes that follow the surface of the generally cylindrical body 20.

In the illustrated embodiment, the slot 44 is formed by a plate 50 fixed to the body 20. The plate 50 is fixed to the body 20 adjacent a trailing side of a recess 52 in the body 20, and extends toward the leading side of the recess to form the slot 44 between the plate 50 and the body 20. The tab portion 46 on the trailing end 18 of the segment 14 or 16 is captured in the slot 44. When the segment 14 or 16 is released and the leading end 24 rotates outward, the tab portion 46 at the trailing end 18 rotates relative to the slot 44 and pivots about a leading end of the plate 50. The tab portion 46 is prevented from moving outward by the slot 44, particularly by the plate 50, behind which the tab portion 46 is held in the slot 44.

The length and shape of the tab portion 46 and its interaction with the plate 50 and slot 44 defines the angular range of rotation before the cover segment 14 or 16 separates from the body 20. Once the segment 14 or 16 has rotated through the predetermined angle, however, the tab portion 46 no longer extends behind the plate 50, and thus the cover segment 14 or 16 is released from the slot 44 and the body 20, and is free to move outwardly, away from the slot 44, the body 20 in which it is formed, and the dome 12 itself.

The slot 44 and plate 50 also prevent the segment 14 or 16 from moving rearwardly. The cover segments 14 and 16 also include a protrusion 54 that extends inwardly from an inner surface of the segment 14 or 16 for receipt in a corresponding recess 56 in the dome 12 or the body 20 at an intermediate position on an inner surface of the dome cover 10. This protrusion 54 and recess 56 pair can include an annular ring and slot, or one or more discrete protrusions and recesses. When the shear pins 28 are holding the cover segments 14 and 16 together over the dome (FIG. 3), these intermediate protrusions 54 are held in the corresponding recesses 56. The protrusions 54 and recesses 56 thus cooperate with the tab-and-slot joint 22 to prevent both forward and rearward movement of the cover segments 14 and 16 relative to the dome 12.

To improve the outward movement of the cover segments 14 and 16 when the shear pins 28 are released, the cover segments 14 and 16 also provide a spring that biases the cover segments 14 and 16 away from the dome 12. In the illustrated embodiment, the spring is integrated into the dome cover 10. Each segment 14 and 16 of the dome cover 10 is made of a resilient material. The shear pins 28 hold the segments 14 and 16 together, retaining the protrusions 54 in the recesses 56 under tension, thereby imparting a preloaded spring-like force to the cover segments 14 and 16, effectively forming cantilevered springs on either side of the protrusions 54. When the cover segments 14 and 16 are released from the shear pins 28, the segments 14 and 16 seek to return to an unstressed position, effectively springing outward and away from the dome 12 as their leading ends 24 outwardly rotate. When the tab portion 46 of the cover segment 14 or 16 is released from behind the plate 50, the segment 14 or 16 will move outwardly away from the body 20 and the slot 44 in which the cover segment 14 or 16 had been captured. The spring action helps to ensure that air pressure from the velocity of the missile or other body 20 does not prevent the cover segments 14 and 16 from separating.

The resulting joint 22 thus provides a low cost, low profile, cover release that minimizes stress applied to the dome and ensures a release trajectory that will not cause a collision with fins, antennae, or other surface features on the vehicle. The joint 22 also provides a low profile with low aerodynamic drag and adequate clearance that facilitates transport and storage. The joint 22 not only cooperates with the spring force and the aerodynamic forces acting on the cover 10 to impart rotation, but also ensures that the aerodynamic forces will not force the hinge cover 10 back into impact with the dome 12 itself.

Finally, as mentioned above the alignment guide 60 and window slot 62 in the segment 14 or 16 facilitates assembly of the cover 10 over the dome 12. After the tab portion 46 is inserted into the slot 44, the segment 14 or 16 is rotated inwardly toward the closed position, aligning the protruding guide 60 with the alignment window 62. Once all of the segments 14 and 16 are in the closed position, the shear pins 28 can be installed to hold the segments 14 and 16 of the cover 10 in place, and the assembly is complete.

Although the invention has been shown and described with respect to a certain illustrated embodiment, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the illustrated embodiment of the invention.

We claim:

1. A protective cover for an instrument dome extending from a body of a vehicle, comprising:
    multiple segments having trailing ends connectable to a body at joints that allow for rotational movement; and
    a releasable holder that includes a retention device that holds leading ends of the segments together and a release mechanism for causing the retention device to release the leading ends;
    where the joints hold the trailing ends of the segments to the body through a predetermined range of motion beyond which the segments will be released to separate from the body when the segments rotate beyond the predetermined range, and
    where the joints include slots formed adjacent the body and corresponding tab portions extending from the segments and captured in corresponding slots while allowing for relative rotation through the predetermined range of motion.

2. The cover as set forth in claim 1, where the predetermined range is about five degrees to about ninety degrees.

3. The cover as set forth in claim 2, where the predetermined range is about fifteen degrees to about forty-five degrees.

4. The cover as set forth in claim 1, where the tab portions and the slots have corresponding arcuate shapes.

5. The cover as set forth in claim 1, where the segments are movable between a first position in which the tab portions engage respective slots to limit movement of the segments in an outward direction and to limit movement of the segments in a rearward direction, and a second position rotatably displaced from the first position and in which the tab portions are free of contact with the slots that would limit movement of the tab portions in an outward direction, thereby permitting separation of the segments from the body.

6. The cover as set forth in claim 1, where the retention device includes a shear pin that couples the leading ends of two or more segments together.

7. The cover as set forth in claim 6, where the release mechanism includes an actuator to force leading ends of the segments apart to break the shear pin and release the segments.

8. The cover as set forth in claim 1, where the segments are in a closed position when the leading ends of the segments are held together, and in the closed position the segments are preloaded such that when the leading ends of the segments are released they are propelled apart.

9. A protective cover for an instrument dome extending from a body of a vehicle, comprising:
   multiple segments having trailing ends connectable to a body at joints that allow for rotational movement; and
   a releasable holder that includes a retention device that holds leading ends of the segments together and a release mechanism for causing the retention device to release the leading ends;
   where the joints hold the trailing ends of the segments to the body through a predetermined range of motion beyond which the segments will be released to separate from the body when the segments rotate beyond the predetermined range, further comprising a spring element outwardly biasing at least one segment, where at least one of the segments is formed of a resilient material and has a protrusion extending from an inner surface to form cantilever spring portions in the segment on either side of the protrusion.

10. The cover as set forth in claim 9, where the spring element is integrally formed in at least one of the segments.

11. The cover as set forth in claim 1 where the segments are combinable to define an interior volume.

12. A missile comprising a body, an instrument dome extending from the body, and the protective cover as set forth in claim 1.

* * * * *